United States Patent [19]

Haubner et al.

[11] Patent Number: 4,486,832
[45] Date of Patent: Dec. 4, 1984

[54] SEQUENTIAL PROGRAM CONTROL SYSTEM

[75] Inventors: Georg Haubner, Berg; Jürgen Wesemeyer, Nuremberg, both of Fed. Rep. of Germany

[73] Assignee: Robert Bosch GmbH, Stuttgart, Fed. Rep. of Germany

[21] Appl. No.: 294,986

[22] Filed: Aug. 21, 1981

Related U.S. Application Data

[63] Continuation of Ser. No. 020,227, Mar. 13, 1979, abandoned.

[30] Foreign Application Priority Data

Mar. 21, 1978 [DE] Fed. Rep. of Germany ....... 2812242

[51] Int. Cl.³ .............................................. G06F 9/00
[52] U.S. Cl. .................................... 364/200; 364/177; 364/140
[58] Field of Search ... 364/200 MS File, 900 MS File, 364/177, 140, 569

[56] References Cited

U.S. PATENT DOCUMENTS 3,644,719  2/1972  Rouxel et al. .................... 364/177
4,114,190  9/1978  Mazoir ............................. 364/900
4,165,490  8/1979  Howe, Jr. et al. ................ 328/60

Primary Examiner—Gareth D. Shaw
Assistant Examiner—Ronni S. Malamud
Attorney, Agent, or Firm—Frishauf, Holtz, Goodman & Woodward

[57] ABSTRACT

To provide for uniform timing of program control cycles in which different control cycles have different cycling time, the control cycles being connected in parallel to a program control arrangement, timing elements are connected in the respective signal paths controlling the respective cycles and adding time increments to the signals coursing in the respective paths between the input and the output to at least approximate the coursing time of all signal paths to a uniform time duration; if the coursing time periods of the signals through the respective paths do not differ substantially, a fixed delay can be added to all the coursing times so that the percentage variation between the coursing time of different cycles, considering the overall time, is small.

4 Claims, 2 Drawing Figures

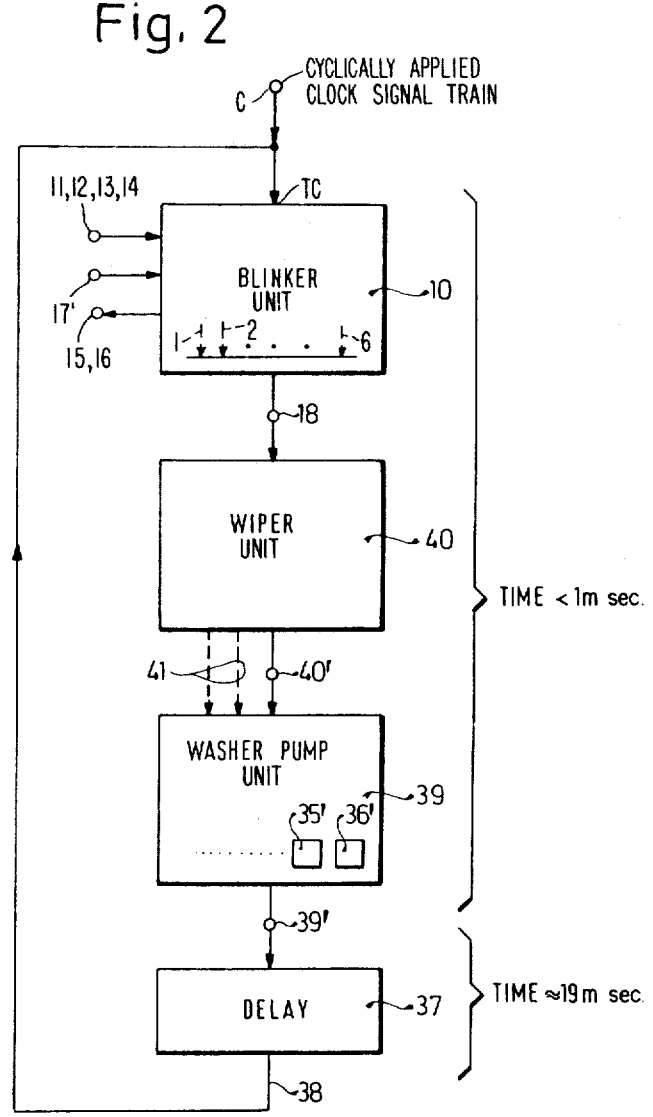

SEQUENTIAL PROGRAM CONTROL SYSTEM

This is a continuation of application Ser. No. 020227, filed Mar. 13, 1979, abandoned.

The present invention relates to a program sequencing system, and more particularly to a sequential program control having a plurality of program paths from an input to an output, which can be selectively enabled, the different paths having different signal coursing time periods or different cycling periods for signals passing therethrough.

BACKGROUND AND PRIOR ART

Mechanical program control systems are well known, utilizing a rotary element in which a motor drives a stepping switch or a cam control switch during one, or more, or fractions of a revolution. The particular programming times of the respective program steps or cycles are controlled by cams formed on the circumference of a camming element. Time periods which are not utilized in some program steps can be obtained by leaving a cam disk blank, that is, not providing any cams thereon which merely causes rotation of the cam disk without, however, causing any switching events, or the like, to be controlled or commanded. Such programmed sequential timers or timing control units have the disadvantage that they are comparatively expensive to make, and are material-and-labor intensive. Their programming, and more particularly the change of programming, is difficult and possible only with considerable replacement of elements or cam disks, involving substantial disassembly and reassembly labor.

THE INVENTION

It is an object to provide a cyclically operating program control system in which programming changes can be easily effected by changing or reprogramming electronic components and in which different programming courses or cycles or paths have essentially the same overall time duration even though the individual coursing time of signals through different paths may differ.

Briefly, the networks or circuit arrangements controlling different signal paths may have timing elements connected thereto adding time increments to the signals coursing between the input and output so that, at least approximately, the coursing time of the signals between the input and output will be the same regardless of the particular program path which has been selected or commanded. In accordance with the invention, a further time increment is serially added, which further increment is large with respect to the average coursing time, so that any variations in coursing time will result in only small percentage changes of the overall time.

The sequence control system has the advantage that very rapid program courses can be carried out in which, nevertheless, the passage or coursing times of the signals therethrough are essentially constant. Programming changes can be easily effected and many variations are possible in the command of the type of program to be carried out. The system additionally permits branching between steps or skipping of steps. The control unit can be made simply and inexpensively using integrated circuit components.

DRAWINGS

Illustrating an example:

FIG. 1 is a highly schematic diagram of the programmed cycling and sequential control system used, for example, to determine the bright and extinction time of direction signal blinkers used in an automotive vehicle; and FIG. 2 illustrates an arrangement in which a plurality of units forming control systems, having programs run therein, and which can be commonly controlled for approximate equal coursing time of signals, in highly schematic and diagrammatic form.

DESCRIPTION OF PREFERRED EMBODIMENTS

Figure 1:
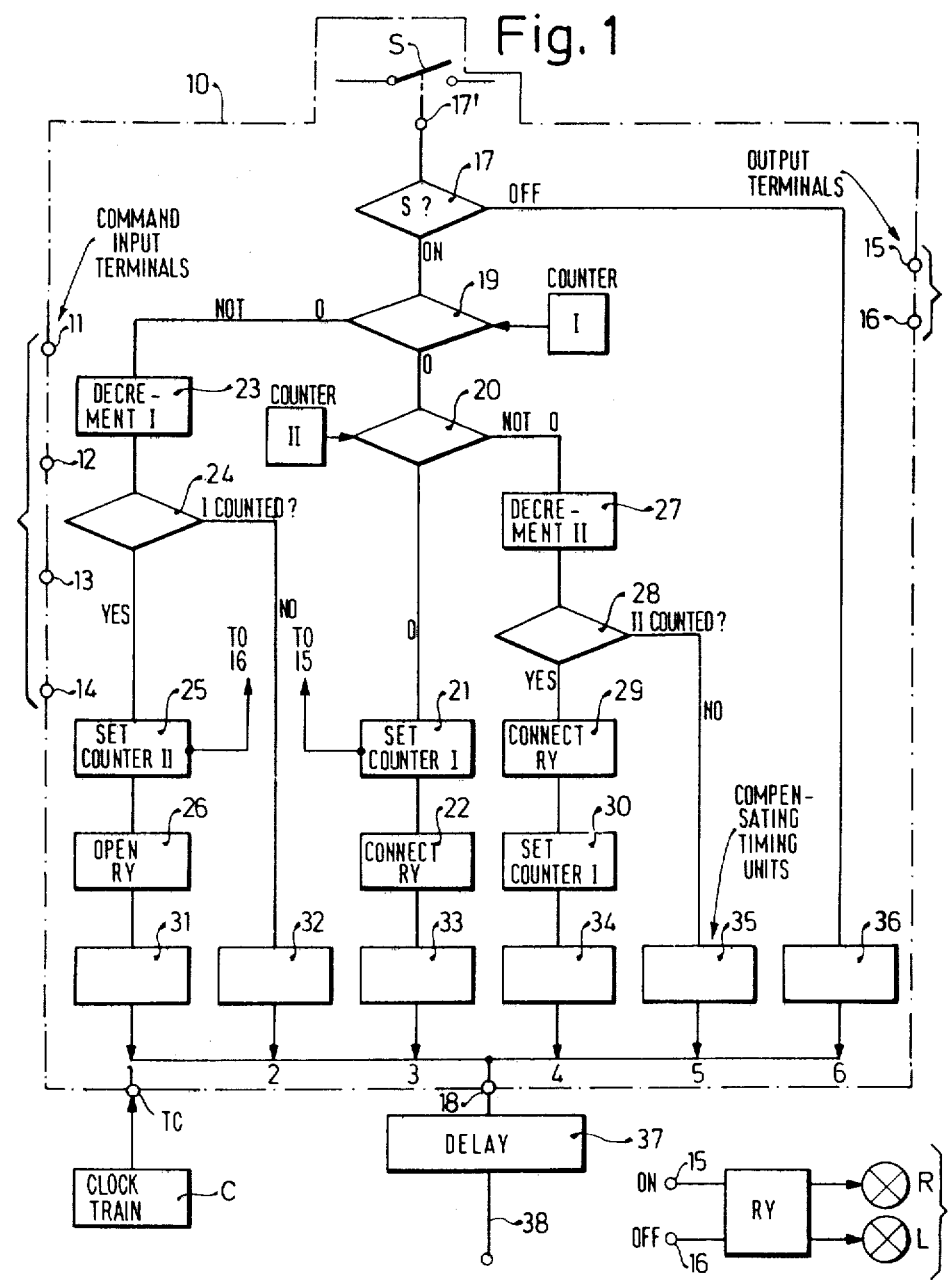

Various program paths, 1, 2, 3, 4, 5, 6, are possible within a sequential program control system 10 (FIG. 1). The respective program paths are commanded by input signals of different characteristics connected to respective command input terminals 11, 12, 13, 14. The example shown in FIG. 1 illustrate a system which is used to determine the respective periods of brightness and darkness of a blinker control for an automotive vehicle. Input 11 will have a signal applied thereto which characterizes "right turn"; input 12 has a signal applied thereto characterizing "left turn"; input 13 has a signal applied thereto characterizing "lane change left", and input 14 has a signal applied thereto characterizing "lane change right". The output terminals 15, 16 will have signals appear thereat which characterizes the brightness or extinction time of respective indicator lamps R, L, secured to a motor vehicle at the right and left sides thereof, respectively. The terminals 15, 16 control the operation of a relay RY which, in turn, controls the energization or deenergization, respectively, of the respective indicators R, L. The signals which are to control the relay should be independent of the respective signal coursing paths 1 to 6 within the sequencing control 10, with respect to time, so that the ON or OFF of the relay RY will not be dependent on the signal path which has been selected within the system 10.

The signal path will be explained with reference to a switch S which is a blinker control switch. The blinker control switch S is connected to the input 17' and provides a signal thereto which is connected to a decision element 17 which determines if the switch S is open or closed, that is, is ON or OFF. If the switch S is OFF, the signal path is directed over the path 6 to the output 18 of the circuit 10 itself. This signal path is cyclically controlled in accordance with a predetermined multiplex or clock time signal train, connected from a clock source C to the circuit 10 at terminal TC, and to the respective decision element, and other components thereof. Thus, if switch S is open or OFF, each clock pulse will cause a signal to pass through path 6 from input 17' to the output 18.

If the blinker is turned ON, that is, if switch S is closed, the decision element 17 will provide an output decision ON to a second decision element 19. The second decision element 19 is connected to a first counter I and determines if the counter state of the counter I is zero or not. The counter I, also, is controlled from the clock source C. If switch S has just been closed, and no flashing of either lamp has occurred, the counter I will be at zero. Consequently, decision element 19 will pass the zero recognition signal upon the next clock pulse to a next decision element 20. The decision element 20 is connected to a second counter II and determines whether the counter state of the second counter is zero or not. Since, as before, the blinker has not yet operated, counter II will be at zero and the signal, upon the next clock pulse, will be connected to an operating element 21. Operating element 21 causes setting of the counter I to a predetermined count state, for decrementing therefrom; or sets the counter I to count to a maximum predetermined value. Thereafter, an operation 22 is commanded which controls the output terminal 15 to turn relay RY ON. The signal path 3 is thus terminated and a new cycle can follow.

The counter I now has been set in operation and, upon the next cycle, decision element 17 will operate as before, but decision element 19 will now provide an output indicative of the state of counter I being other than zero. The decision element 19 will thus provide a "NOT ZERO" output to an element 23 which causes decrementing of counter I by one count—or incrementing if the counter is set to count to a predetermined number. At a next operation, a decision must be made if the counter I is now equal to zero, that is, if counter I has counted to its quiescent value or, if controlled to count up, to its set value.

If the counter state of counter I is NOT ZERO, the signal path or course will be path 2, with no change at the output 15, keeping the relay RY ON and the respective right or left lamp lit. At the next cycle, the same signal path will be followed until, because of incrementing or decrementing respectively of the counter I in the unit 23, the counter I has counted to zero, that is, the counter state of counter I is equal to zero. When the counter I, after the decrementing step in operation 23 is zero—at a prior clock pulse counter I was not yet zero so that the decision element 19 routed the signal to element 23—then decision element 24 will provide a "YES" or "ZERO" output. This means that the bright or illuminated period of the respective lamp R, L is terminated and the dark period will start. Counter II is set in operation 25, for subsequent decrementing—or permitting incrementing to a predetermined number—and, simultaneously, the relay RY is commanded to open by control of terminal 16, as schematically indicated by operation 26. This also terminates the signal course or cycle of path 1 and the cycle starts anew.

Initially, the decision element 17 again determines if switch S continues closed. Since blinking is commanded, switch S is closed. The counter I, however, is now zero and the signal will pass down to the decision stage 20. Decision stage 20 will recognize that counter II which, in a preceding cycle, has been set, does not have a zero signal, and thus will command the signal to pass to operation 27, which commands decrementing of counter II—or incrementing to a predetermined value. Thus, if decision element 20 senses that the counter II is NOT 0, path 5 will be controlled since decision element 28 will provide a NO signal, determinative of the state of the counter II; counter II, as assumed, is NOT 0. At the next subsequent cycle, decision element 27 will continue to decrement the counter II until the count stage of counter II is zero. At that time, decision element 28 will provide a "YES" or 0 output signal to control the signal path to be over path 4. The relay RY will then be commanded to ON via terminal 15 in operation 29, and also, counter I is set in operation 30, terminating the dark or extinction time.

The sequence of cycles will now repeat, so that the counter I is set and decremented or incremented, respectively, in subsequent cycles until counter I is again zero, terminating the illuminating or energization time, permitting subsequent counting of counter II, and so on.

As can be clearly seen, coursing of signals through the various signal paths 1 to 6 will take different passage time since each operation requires a separate clock pulse, and the various signal paths have different numbers of operations and different decision points which control the operations. To obtain a constant passage time, however, independent of the length of the passages or coursing times of the various paths 1 to 6, and to thereby maintain the brightness and darkness time and control of the relay RY constant, each one of the signal paths 1 to 6 includes an additional compensating timing unit 31, 32, 33, 34, 35, 36, respectively. These timing units can be programmed or controlled, for example fixed if the entire unit is a fixed program, so that the entire signal coursing time from the first decision element 17 down to the unit output 18 always will be a constant timing period. The compensating time which is added by the timing units 31 . . . 36, respectively, can be formed, for example, by storing the signals and permitting them to cycle through predetermined numbers of clock pulses, or through an empty program, not affecting any specific operation. Thus, operations which have no influence on the input or output signals which are effectively commanded by the system can be carried out, for example merely to utilize the existing components.

Rather than adding individual compensating time periods to the individual program paths 1 to 6, it is also possible to add a predetermined delay to the overall signal path from clock pulse train input TC to an output 38. The delay element 37 will introduce a delay which is very substantial with respect to the actual coursing times of the respective signal paths 1 to 6, and specifically with respect to the differences in coursing times so that, for all practical purposes, differences in coursing times of signals from input TC to output 38 can be neglected in view of the substantial delay introduced in element 37. The overall signal coursing time from the input TC to the output 38 then will be determined, essentially, by the delay period of the element 37, and the differences of this coursing time will, based on the overall time, depending on the specific path selected, be small with respect to the overall time so that, from a percentage point of view of the overall time between input TC and output 38, the differences can, essentially, be neglected.

The compensating timing units 31 . . . 36 can all be similar and, if they add a time period which is quite long with respect to the difference in coursing time in the various signal paths, then such time can already be added to the respective individual paths. Although, in such an arrangement, the signal coursing times are not exactly equal, the overall time of signal passage from input TC to the output 18 will be at least approximately constant.

A plurality of programmed sequencing control paths similar to path 10 can be passed sequentially by signals, and in such an arrangement, it may be sufficient to add a delay time comparable to delay 37 at only one point of sequentially or serially connected individual control elements. FIG. 2 illustrates a loop circuit in which the overall passage or coursing time of the signals is maintained to be approximately constant, if the delay introduced by delay element 37 is long with respect to the actual coursing times, and more specifically the coursing time differences of signals passing through programmed sequence units 10, 39, 40, in which the respective signal paths have different actual coursing time periods. The respective sequential control units 10, 39, 40 may, each, be constructed similar to element 10 as shown in FIG. 1 and add their own individual compensating time periods in compensating units 31, 32 . . . 36; if, however, the requirements for accurate maintenance of equality of the various coursing times are not very high, the respective programmable units 10, 39, 40 can be constructed without individual additional coursing time elements associated with individual paths in the respective units as shown, for example, schematically at elements 35', 36' in programmable unit 39. The output terminal 18 from blinker unit 10 is connected to the input of unit 40; its output terminal 40' then directly connects to programmable unit 39 and, if the elements 35', 36' therein are not used, the output 39' can be connected to a common delay 37, as in the embodiment of FIG. 1. Individual program paths can also be connected, as shown schematically by cable 41 to individual program paths in unit 39, for example to decision elements which are cascaded, or capable of making multiple decisions, for example multiple-input AND-gates which are suitably connected in accordance with a suitable logic diagram.

The output terminals from the programming units 39, 40 (FIG. 2) have been omitted from FIG. 2; the units can, of course, individually control respective commanded functions, in accordance with the logic of the respective programs of units 10, 39, 40.

In a typical blinker control system, the clock rate of clock C is: 4.43 MHz. The signal coursing time of the signals through path 6 in such a system is: 2 msec. The signal coursing time of a signal through path 1 is: 0.7 sec. A delay period of delay unit 37 suitable to approximately equalize the coursing time of signals in such a system will introduce a delay of 19 msec. The delay may be associated with the clock rate, so that, for example, the delay introduced by the circuit 37 will be in the order of at least $0.96 \cdot 10^5$ times the average number of clock pulses for a signal passing through any one of the paths 1, 2 . . . 6. This relationship is not critical and will depend on the degree of equalization required for a specific application.

Various changes and modifications may be made within the scope of the inventive concept.

The units and element 17, 19, 20, 22-29, 31-36, 37 are standard integrated circuits, for example:

| 31-36, 37 | CD 4047 | timing unit |
|---|---|---|
| 17 | CD 4001, 4011 | NOR, NAND |
| 19,20,24,28 | CD 4030, 4002 4011 | 8 bit comparator |
| 23,27,21,25 | CD 4024 | counter |
| 29,22,26 | CD 4010 and driver transistor BC 337 and relay | amplifier |

We claim:

1. Sequential program control system combination comprising
    a plurality of sequential separate program control units (10, 40, 39), each having a plurality of selectable paths (1 . . . 6) from a signal train input (TC) to a signal train output (18) which are selectively enabled, and in which different paths have different signal coursing time periods,
    each of said separate control units responding to selectable command input data (11-14; 17') addressing at least one of a selected path in said units,
    said units providing outputs (15, 16) in accordance with selected command input data;
    means for connecting the signal train output (18) of a first one (10) of the plurality of the separate units to the signal train input of a further one unit (40, 39) of said plurality of separate units to thereby connect said units in a serial chain and enable the further unit (40, 39) when a signal train output from the next preceding unit in the serial chain is received;
    at least one common time delay element (37) connected in the serial chain connection of said first and further units, and adding a fixed time delay to the signals coursing in said respective paths, which fixed delay is substantially longer than the longest of any one of the signal coursing time periods through any one of said paths, to maintain approximately constant the overall coursing time of the signals through said series connection of the units regardless of the selected path of the signals in any one of the units;
    means connecting the signal train output of the serial chain to the signal train input of said serial chain to connect the serial chain in a closed loop having a signal coursing time therein which is essentially independent of the selected signal paths in said units, thereby forming a closed loop serial chain; and
    means (C) for applying cyclical signal trains to said closed loop serial chain.

2. System combination according to claim 1, wherein at least one of the units has at least two parallel paths,
    and further including at least one individual timing element (35', 36') connected into at least one path of at least one of said units (10, 39, 40) and adding a time delay to a signal coursing in said at least one path of such a time period to equalize the coursing time of the selected signal through said at least one path with respect to the coursing time of a signal passing through another parallel path in said at least one unit.

3. System combination according to claim 1, wherein the delay time of said at least one common time delay element is at least about ten times the maximum coursing time period through any one of said paths.

4. System combination according to claim 1, wherein the delay time of said at least one common time delay element (37) is about 20 times the difference between the shortest or longest coursing time through said different paths, and the average coursing time through all the paths.

* * * * *